United States Patent

Hughes et al.

(10) Patent No.: US 6,468,435 B1
(45) Date of Patent: Oct. 22, 2002

(54) AUTOMATIC VALVED FILTER ASSEMBLY

(75) Inventors: Douglass E. Hughes, 3457 Iris Ct., Boulder, CO (US) 80304; Raymond G. Bryan, Reno, NV (US)

(73) Assignee: Douglass E. Hughes, Boulder, CO (US)

( * ) Notice: Subject to any disclaimer, the term of this patent is extended or adjusted under 35 U.S.C. 154(b) by 0 days.

(21) Appl. No.: 09/549,844

(22) Filed: Apr. 14, 2000

Related U.S. Application Data

(63) Continuation-in-part of application No. 09/525,106, filed on Mar. 14, 2000, which is a continuation-in-part of application No. 08/988,864, filed on Dec. 11, 1997, now abandoned, which is a continuation-in-part of application No. 08/685,334, filed on Jul. 23, 1996, now Pat. No. 5,840,185.

(51) Int. Cl.[7] .............................................. B01D 37/00
(52) U.S. Cl. ........................ 210/767; 210/110; 210/117; 210/282; 210/418; 210/473
(58) Field of Search ................................ 210/109, 266, 210/282, 418, 464, 466, 472, 473, 474, 475, 477, 482, 767, 110, 120, 136, 436, 437, 451, 452, 117; 222/189.06, 189.07, 189.08, 308, 311, 387, 388

(56) References Cited

U.S. PATENT DOCUMENTS

| 2,761,833 | A | * | 9/1956 | Ward |
|---|---|---|---|---|
| 5,417,800 | A | * | 5/1995 | Kay .............................. 210/472 |
| 5,431,813 | A | * | 7/1995 | Daniels ....................... 210/282 |
| 5,439,143 | A | * | 8/1995 | Brown et al. |
| 5,545,315 | A | * | 8/1996 | Lonneman ................... 210/136 |
| 5,609,759 | A | * | 3/1997 | Nohren et al. .............. 210/266 |
| 5,840,185 | A | * | 11/1998 | Hughes et al. .............. 210/266 |
| 5,914,045 | A | * | 6/1999 | Palmer et al. ............... 210/136 |
| 5,928,512 | A | * | 7/1999 | Hatch et al. ................. 210/266 |
| 5,971,357 | A | * | 10/1999 | Denton et al. |
| 6,004,460 | A | * | 12/1999 | Palmer et al. ............... 210/282 |
| 6,136,189 | A | * | 10/2000 | Smith et al. ................. 210/282 |
| 6,153,096 | A | * | 11/2000 | Nonren et al. .............. 210/472 |

\* cited by examiner

Primary Examiner—Joseph W. Drodge
(74) Attorney, Agent, or Firm—Steven C. Petersen; Sarah S. O'Rourke; Hogan & Hartson LLP

(57) ABSTRACT

The valved filter assembly of the present invention utilizes a bi-directional pressure differential valve in fluid communication with a filter body housed within a container, such as a bottle. This unique structure allows the user to dispense filtered fluid from a bottle only when the bottle is inverted and squeezed. Squeezing the bottle causes the pressure to increase on the inside of the bottle thereby causing water to traverse the filter body thus contacting and opening the bi-directional pressure differential valve thereby allowing liquid to exit; however, when no pressure is applied to the bottle the bi-directional pressure differential valve remains in the closed position sealing the bottle.

32 Claims, 10 Drawing Sheets

AUTOMATIC VALVED FILTER ASSEMBLY

CROSS-REFERENCE TO OTHER PATENT APPLICATIONS

This application is a continuation-in-part of a prior, co-pending U.S. application, entitled "Universal Filter for Soda Pop and Bottled Water Bottles," filed Mar. 14, 2000, application Ser. No. 09/525,106, which in turn is a continuation-in-part of entitled "Universal Filter for Soda Pop and Bottled Water Bottles," filed Dec. 11, 1997, Ser. No. 08/988,864 (now abandoned), which in turn is a continuation-in-part of U.S. application, entitled "Sports Bottle Filter Cartridge," filed Jul. 23, 1996, Ser. No. 08/685,334, now U.S. Pat. No. 5,840,185.

BACKGROUND OF THE INVENTION

1. Field of the Invention

This invention relates generally to a valved filter. More specifically, this invention relates to a filter having a pressure differential valve which allows filtered fluids to flow out through the valve only when the bottle containing the fluid and filter is inverted and squeezed.

2. Description of the State of Art

As water filtration of tap water has become more popular, the trend has led into portable water filters as well. These devices are used to decontaminate water in the wilderness of bacteria and parasites as well as being used in cities where they are relied upon to remove chlorine, taste and odor from municipally treated tap water. Most filters today have been designed to retrofit into existing containers, the most popular being the 28 mm outside thread diameter soda pop or mineral water bottles available in any supermarket. Other versions are the wide mouth bike or sport bottles, which have thread diameters as high as 53 mm to 70 mm.

The aforementioned containers nearly always use either (i) a manual push-pull valved top that allows the container's closure or "cap" to open and close by pulling the top up to achieve an open position and pushing the top down to close it, or (ii) a non-valved closure that merely caps the bottle by screwing on or off. The push-pull valve means is used for nearly all bike bottles; however, the standard push-pull valve has a number of drawbacks that make its use difficult if not just plain undesirable. First, push-pull valves constantly require the use of the thumb and index finger to operate the valve, thereby passing germs from the user's hands to the drinking spout. Hands and fingers are almost always covered with a variety of bacteria and viruses omnipresent on everything we touch. What is more, most water filters by necessity use some type of activated carbon, which may become a good breeding ground for bacteria and other microorganisms. Consequently, the push-pull valve creates a dubious interface between the liquid being consumed and the user, since there is no effective way of opening it without using it as a stepping stone for spreading bacteria and other germs. Yet another drawback to the push-pull valve is that it actually requires both hands, since one hand must hold the container while the other hand operates the valve. While some users grasp the valve in their teeth to pull the valve open they eventually will have to push the valve closed which is typically accomplished by using the palm of their hand. Since the push-pull valve is almost always a two-handed operation, performing typically safe activities that require at least one hand at all times, such as driving a car or bicycle, place the user at risk as they are no longer using their hands to steer their vehicle.

The disadvantages of the non-valved closure, that merely caps the bottle, is that it too requires two hands to screw the cap on or off the bottle and it too easily spills if the bottle is knock over and the cap is not securely fastened.

Therefore, there is a need for a portable container which is capable of filtering water of contaminants while simultaneously availing itself to being operated with only one hand that does not need to come into direct contact with the closure.

SUMMARY OF THE INVENTION

Accordingly, it is a general object of this invention to provide a liquid filter system that removes chlorine, heavy metals, taste, color, odor and microorganisms from water while at the same time is simple and sanitary to use.

Another object of the invention is to provide a liquid filter system that when inserted into a bottle results in a cap that does not have to be physically touched in order to be opened or closed.

Additional objects, advantages and novel features of this invention shall be set forth in part in the description that follows, and in part will become apparent to those skilled in the art upon examination of the following specification or may be learned by the practice of the invention. The objects and advantages of the invention may be realized and attained by means of the instrumentalities, combinations, compositions, and methods particularly pointed out in the appended claims.

To achieve the foregoing and other objects and in accordance with the purposes of the present invention, as embodied and broadly described therein, the apparatus of this invention may comprise a filtering device having a pressure differential valve which is normally in the closed position until a pressure is exerted on the valve wherein the pressure is great enough to force the valve open.

BRIEF DESCRIPTION OF THE DRAWINGS

The accompanying drawings, which are incorporated in and form a part of the specification, illustrate the preferred embodiments of the present invention, and together with the description serve to explain the principles of the invention.

In the Drawings.

DETAILED DESCRIPTION OF THE PREFERRED EMBODIMENT

Figure 1:
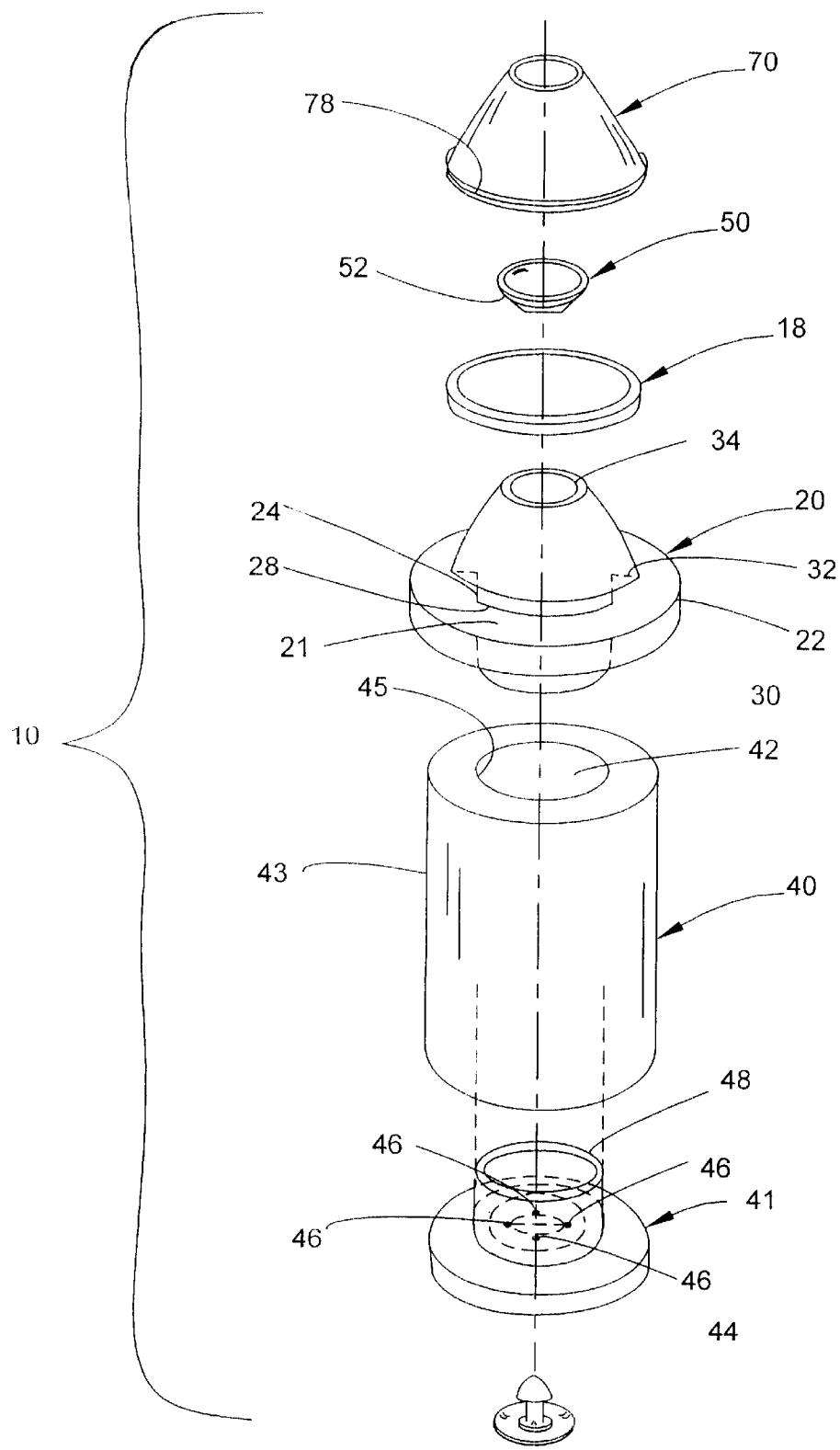
FIG. 1 is an exploded isometric side/front view of the individual structures comprising the valved filter of present invention.
Figure 2:
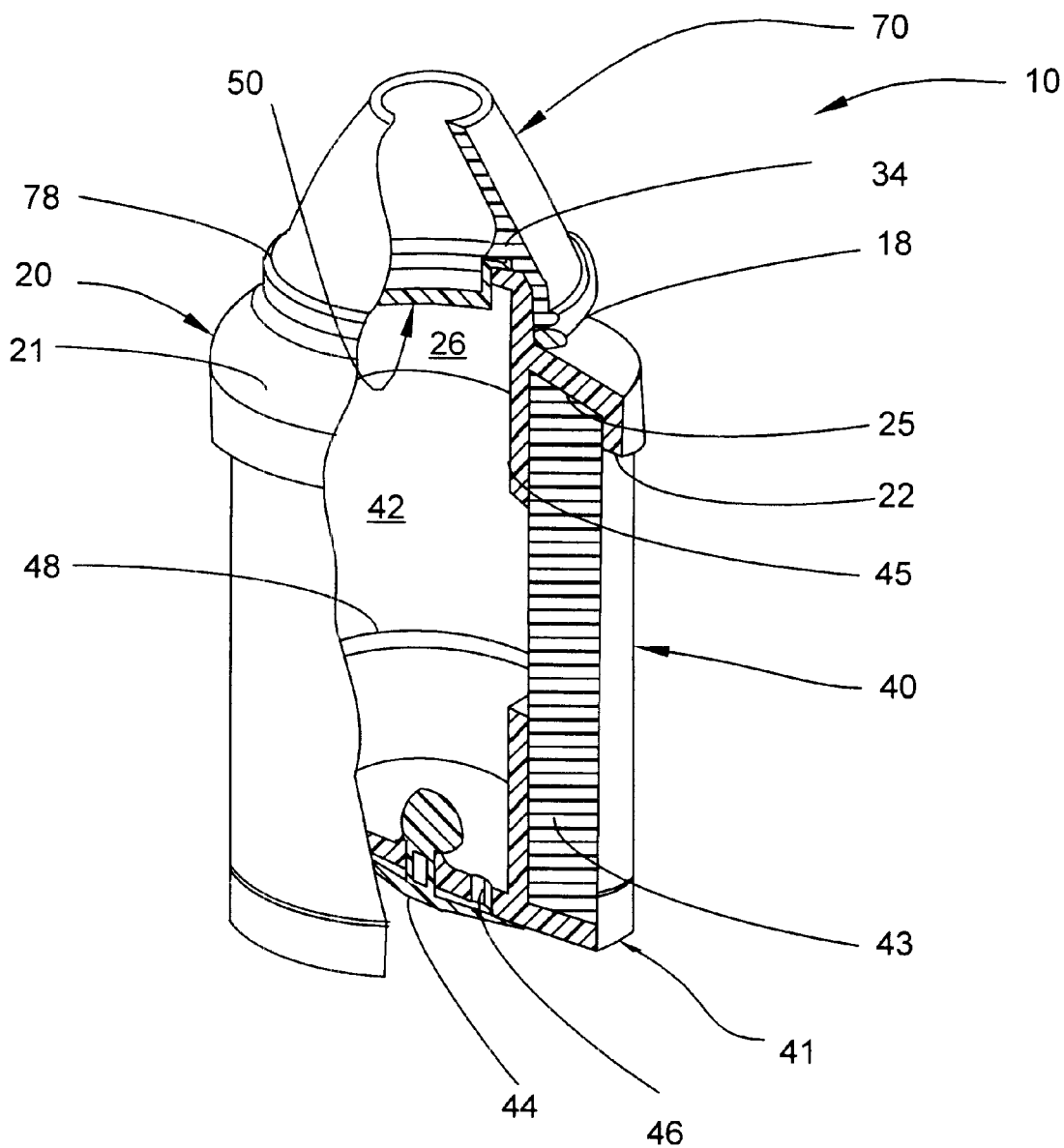
FIG. 2 is a perspective view of the valved filtering device of the present invention, with portions cut away to reveal the internal structure as assembled.
Figure 3:
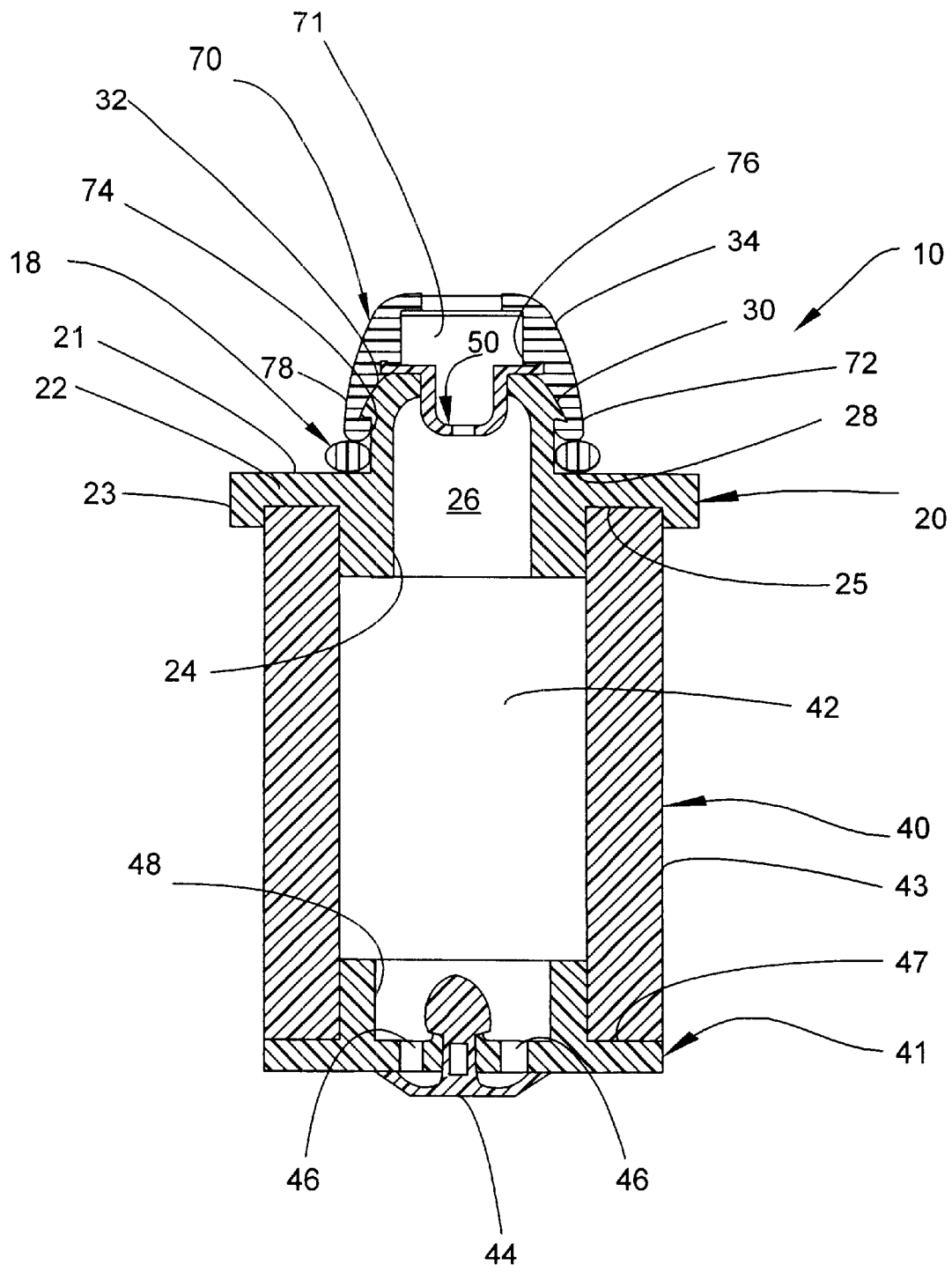
FIG. 3 is a schematic cross-sectional side elevation view of the valved filtering device of the present invention.

The valved filter assembly 10, according to this invention, is best illustrated in FIGS. 1, 2 and 3 and comprises a filter cap 20 which houses the pressure differential valve 50 and attaches to filter body 40. Each individual element comprising valved filter assembly 10, that is, the valve cover 70, pressure differential valve 50, O-ring 18, filter cap 20, filter body 40 and filter base 42 are shown separated from each other in FIG. 1, to illustrate their individual structures and will be discussed in further detail below. This unique valved filter structure allows the user to dispense filtered fluid from a bottle only when bottle 100 (shown in FIGS. 9 and 10) is inverted and squeezed. Squeezing causes the pressure to increase on the inside of the bottle 100 thereby causing water to traverse filter body 40 thus contacting and opening pressure differential valve 50 thereby allowing liquid to exit; however, when no pressure is applied to bottle 100 pressure differential valve 50 remains in the closed position sealing bottle 100.

Essentially, the valved filter 10 is assembled, as best shown in FIGS. 1, 2 and 3, by securing a valve which is preferably a two-way valve such as a pressure differential valve 50, manufactured and sold by Liquid Molding Systems, Inc., Midland Michigan, under the name LMS valve, to filter cap filter cap 20. As a way of example, but not to be limiting, other types of two-way valves that could be utilized in the present invention are duck bill valves. As discussed below, in an alternate embodiment, a one-way valve can be used in combination with a filter according to this invention; however, an air inlet must then be placed elsewhere on the bottle or cap.

Filter cap 20 is preferably, but not necessarily molded from a unitary piece of rigid plastic material and includes a base platform 22 having a neck 24 protruding transversely outward from both sides of platform 22. Neck 24 has a counter bore 26 extending there through. As the upper end of neck 24 emerges from the front side 21 of base platform 22 a lower seating surface 28 is formed for positioning an O-ring 18 around the periphery of neck 24. Immediately above the lower seating surface 28 neck 24 flares radially outward forming a flange 30 having a lower surface 32. The outer surface of neck 24 then tapers inward until it meets counter bore 26 thereby forming a seating surface 34 at the upper end of neck 24. The edge 23 of base platform 22 projects downward thus forming an annular groove 25 extending radially outward from the lower end of neck 24 to the edge 23 of base platform 22 for capturing the filter body 40 when the filter body 40 is assembled with the filter cap 20, as shown in FIGS. 2 and 3.

The type of filter body 40 utilized in the present invention is preferably a substantially self-supporting molded carbon block having liquid porous side walls 43, a bottom end 47 and a top end 45. However, there are many types of self-supporting filters available that are well known to those skilled in the art and could be easily substituted. Examples of filtering materials include, but are not limited to, free sintered powder or granulated polymers, also known as porous plastic, the manufacture of which includes but is not limited to the following materials, high Density Polyethulene (HDPE), Ultra High Molecular weight Polyethylene (UHMW), Polypropylene (PP), Polyvinylidene Fluoride (PVDF), Polytetrafluoroethylene (PTFE), Nylon 6 (N6), Polyethersulfone (PES), and Ethylene Vinyl Acetate (EVA); free sintered polymer materials in combination with a fine granular material, such as an activated carbon; or a granular blended media of granular activated carbon and either an ion exchange resin or a natural or artificial zeolite; however, any type of filtering material will suffice. Other types of filter cartridges that are not self-supporting but are contemplated for use in the present invention are typically made from a plastic container which holds a loose granular filtering material, such as the type of cartridge disclosed in U.S. Pat. No. 5,840,185, which is incorporated herein by reference.

Filter base 41 comprises a collar 48 which protrudes outwardly from filter base 41 and a one way valve 44 such as, but not limited to, an umbrella valve which when in the closed position covers a plurality of air ports 46 located in filter base 41. The collar 48 of filter base 41 fits within the counter bore 42 of filter body 40 and thus forms a water tight seal around the bottom end 47 of filter body 40.

Pressure differential valve 50 having an outer rim 52 is next inserted into counter bore 26 of filter cap 20 as shown in FIGS. 2 and 3. The outer rim 52 bears on seating surface 34 and is held in place by valve cover 70. The structure and operation of pressure differential valve 50 is fully disclosed in U.S. Pat. No. 5,439,143 which is incorporated herein by reference; however, pressure differential valve 50 is germane to the operation of the present invention and consequently the operation of pressure differential valve 50 is described in detail below. Valve cover 70, shown in FIG. 3, is preferably but not necessarily molded from a rigid plastic material and has a counter bore 71 extending there through. The lower end 72 of valve cover 70 has an inner diameter which is slightly larger than the outer diameter of neck 24 and a first annular groove 74 and a second annular groove 76 exist around the inner circumference of valve cover 70. As valve cover 70 is positioned over the upper end of neck 24 flange 30 is received by and snaps into place within the first annular groove 74 while simultaneously the outer rim 52 of pressure differential valve 50 is received by the second annular groove 76 and is securely fastened into place. As valve cover 70 is received by the open orifice 122 of bottle cap 120 (FIG. 9) the lower edge 124 of orifice 122 may come in contact with and sits on flange 78 but does not necessarily need to.

With reference to FIGS. 4–7, the illustrated pressure differential valve 80 has an integrally formed, once-piece construction. Pressure differential valve 50 has an interior side 52 which interfaces with the fluid product or water, W in container 100 (not shown), and an oppositely oriented exterior side 54 which interfaces with valve cover 70. Pressure differential valve 50 is preferably molded from a resiliently flexible material, and in the illustrated example comprises a silicone rubber which is substantially inert.

In operation, bottle 100 (shown in FIGS. 9 and 10) in combination with valved filter assembly 10 of the present invention, function in the following manner. Pressure differential valve 50 normally assumes the inwardly protruding orientation illustrated in FIG. 4 wherein pressure differential valve 50 remains substantially in its original molded shape without deformation, with connector sleeve 57 being fully retracted and discharge opening 56 being fully closed. When pressure differential valve 50 is pinched between seating surface 34 and annular groove 76 as is shown in FIG. 3, pressure differential valve 50 is configured such that discharge orifice 56 will remain securely closed, even under the hydraulic head pressure applied thereto by the fluid product W when the bottle 100 is completely full.

Figure 4:
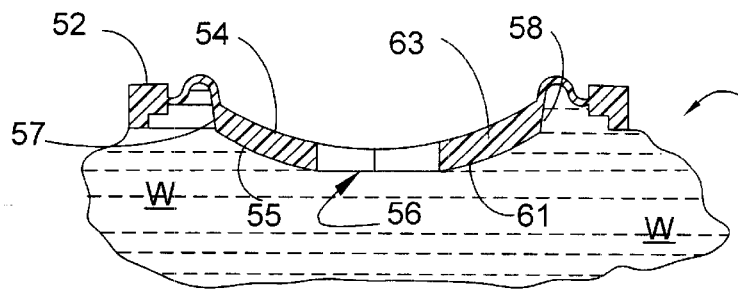
FIG. 4 is a cross-sectional view of the pressure differential valve used in the present invention shown in a fully closed, and partially extended position.
Figure 5:
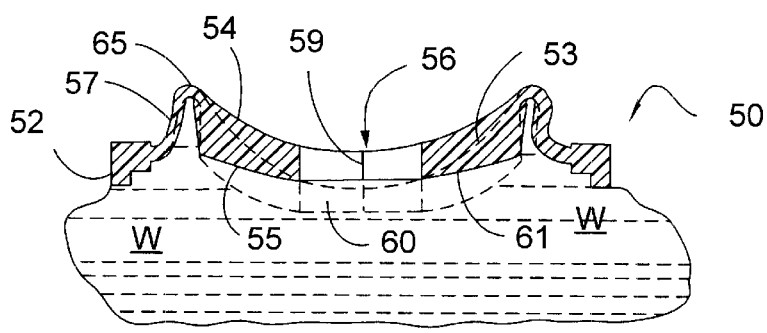
FIG. 5 is a cross-sectional view of the pressure differential valve used in the present invention shown in a fully closed, and fully extended position, wherein a valve head portion which is shown beginning to snap outwardly.

When bottle 100 is inverted, additional pressure is communicated with the interior of container 100, such as by manually flexing container side walls 114 and 115 inwardly, connector sleeve 57 functions as a rolling diaphragm, and permits valve head 55 to begin shifting axially outwardly toward the filter cap 70 by doubling over connectors sleeve 57, which then in turn, begins to extend outwardly in a rolling fashion, as illustrated in FIG. 5. The outwardly protruding J-shaped configuration of connector sleeve 57 assists in initiating this rolling motion of connector sleeve 57. The elastic deformation of connector sleeve 57 from its original molded shape (FIG. 4), generates a complex pattern of stresses within valve 50 which resiliently urges the same back into its original or normal configuration, which forces include an outwardly directed torque applied by connector sleeve 57 to valve had 55 adjacent marginal edge 58, which tends to resiliently urge discharge orifice 56 toward its open position, as described in greater detail below.

When additional pressure is communicated with the interior of container 100, as illustrated in FIG. 5, valve head 55 continues to shift axially outwardly by rolling connector sleeve 57 over upon itself. The marginal edge 58 of valve head 55 passes through the center of marginal valve flange 54.

When additional pressure is communicated with the interior of container 100, as illustrated in FIG. 5, valve head 55 continues to shift outwardly. However, since connector sleeve 57 is fully extended, further outward shifting of valve head 55 longitudinally tenses or stretches connector sleeve 57, thereby increasing the outwardly directed torque applied to the valve head 55. Also, the further outward movement of valve head 55 tends to flatten or straighten valve head 55, particularly along the exterior surface 60 thereof, as best illustrated in the broken line figure in FIG. 6. This flattening motion tends to enlarge or dilate the circular plan configuration of valve head 55, which enlargement is in turn resisted by radially inwardly directed forces applied to the marginal edge 58 of valve head 55 by connector sleeve 57, thereby generating another complex pattern, of stresses within valve 50, which forces include those which tend to compress valve head 55 in a radially inward direction. Due to the tapered shape of valve head 55, the majority of compression strain is believed to take place adjacent the center portion 61 of valve head 55. As best illustrated by a comparison of the broken line figure and the full line figure provided in FIG. 6, when connector sleeve 57 is in the fully extended position, as shown in the broken lines, and additional pressure is communicated with the interior side 55 of valve 50, exterior rim 65 moves axially outwardly and radially outwardly as shown in the full lines of FIG. 6. The marginal edge 58 of valve head 55 is shown bent or elastically deformed inwardly as a consequence of the torque forces applied thereto by connector sleeve 57.

Figure 7:
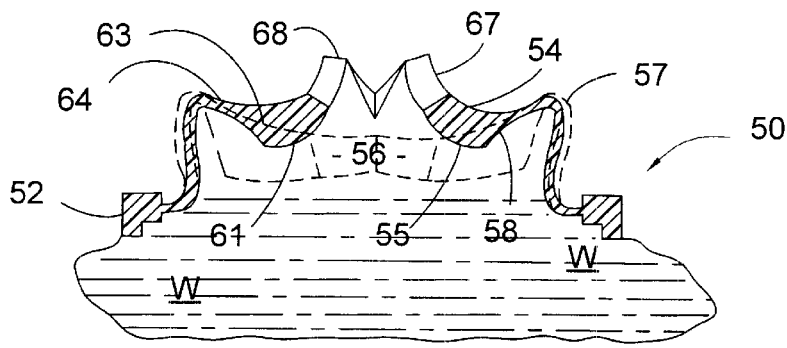
FIG. 7 is a cross-sectional view of the pressure differential valve used in the present invention shown in a fully open, and fully extended position, wherein the valve head portion which is shown snapped fully outward.

When additional pressure is communicated with the interior of container 100, as illustrated in FIG. 7, valve head 55 continues to shift outwardly by further longitudinal stretching of connector sleeve 57, and further enlargement of the plan shape of valve head 55. This motion is best illustrated by a comparison of the broken line figure and the full line figure provided in FIG. 7. Exterior rim 95 moved from the condition illustrated in FIG. 7, which corresponds to the broken line figure of FIG. 8, in an axially outwardly and radially outwardly fashion to the position shown in the full lines of FIG. 8. The marginal edge 58 of valve head 55 is shown more bent or elastically deformed inwardly, as a consequence of the increased torque forces applied thereto by connector sleeve 57. These combined forces and motions also serve to further compress valve head 55 into a state of bifurcation, as illustrated in FIG. 7, wherein the combined forces acting on valve head 55 will, upon application of any additional outward force on the interior side 55 of pressure differential valve 50, cause the same to quickly open outwardly with a snapping motion to separate valve flaps 67 in the manner illustrated in FIG. 7, and thereby dispense water through discharge orifice 56. The bifurcation state of pressure differential valve 50, as the term is used herein, is illustrated in FIG. 7, and defines a relatively unstable condition which valve 70 assumes immediately prior to opening into the filly open condition shown in FIG. 7. As pressure differential valve 50 passes through the bifurcation state shown in FIG. 7, the combined forces acting on valve head 55 are in a very temporary, unstable condition of equilibrium for a given moment, and then quickly shift valve head 55 into a generally convex shape, simultaneously opening orifice 56. In the bifurcation state shown by the full lines in FIG. 7, valve head 55 assumes the shape of a nearly planar disc, with exterior surface 68 cupped inwardly between rim 65 and flap edges, and interior surface 69 bent slightly outwardly toward the center of orifice 66.

The snap type opening of pressure differential valve 50 is achieved, at least in part, by the torque exerted on valve head 55 by connector sleeve 57, which as noted in the example illustrated in FIG. 7, is sufficient to substantially distort the shape of the marginal edge 58 of valve head 55. When pressure differential valve 50 assumes the filly extended and fully open position illustrated in FIG. 7, valve flaps 67, as well as the associated rim portion 63 of valve head 55 are bent or elastically deformed outwardly, thereby permitting the rim 64 of valve head 55 to become smaller or constrict slightly. Valve flaps 67 tend to fold openly along lines extending between orifice slits 45 and 46. The continued radial inwardly compression applied to valve head 55 by connectors sleeve 57, in addition to the outwardly oriented torque applied thereto by connector sleeve 57, combine to keep discharge orifice 56 in the fully open position, even if the pressure communicated with the interior of bottle 100 is reduced. Hence, after discharge orifice 56 has been opened through the application of the predetermined opening pressure, that pressure which is required to maintain fluid flow through orifice 56 is reduced, or less than the threshold pressure, so as to provide greater dispensing ease and flow control. Since the resiliency of connecter sleeve 57 serves to resist the dilating action of valve head 55, and thereby compresses the same to achieve a snap open/snap close motion, if the resiliency of connector sleeve 57 is varied somewhat, such as by making connector sleeve 57 thicker or thinner, the amount or degree of snap action can be thereby adjusted for any specific application. Similarly the resilient strength of ring 56 can be adjusted to accomplish the desired snap action.

Figure 8:
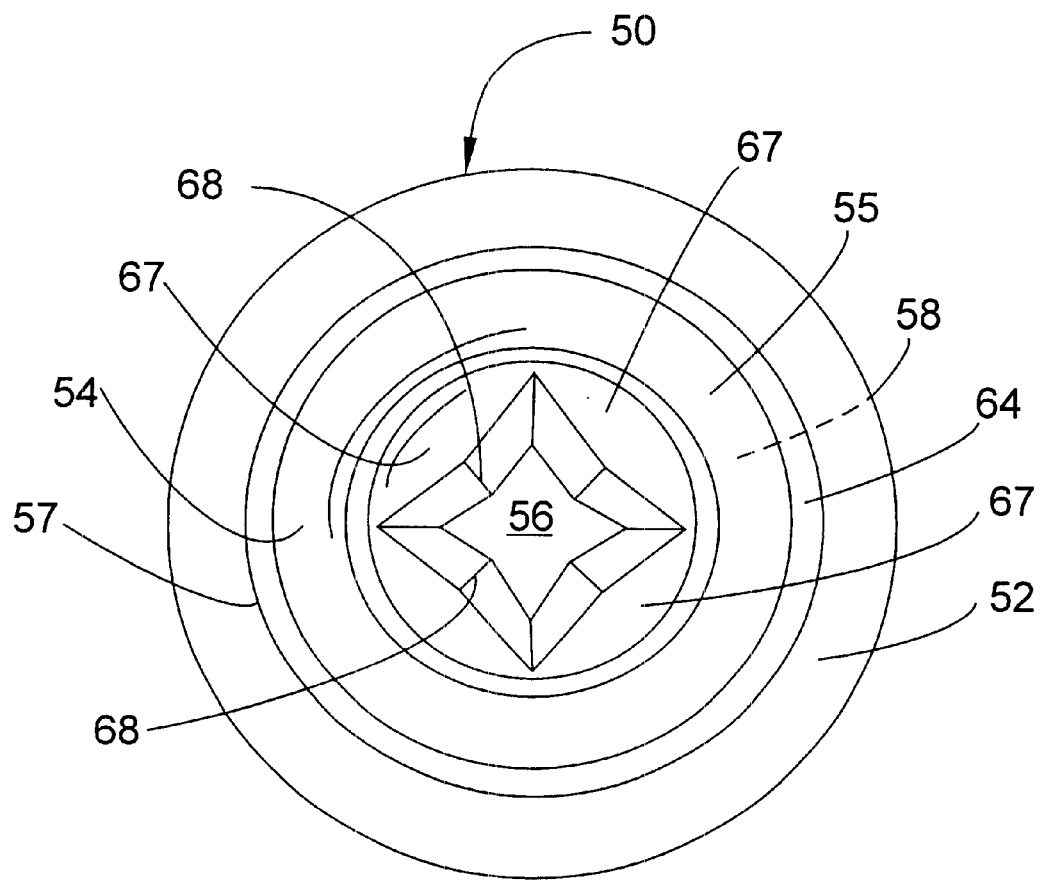
FIG. 8 is a bottom plan view of the pressure differential valve shown in the position illustrated in FIG. 7.

The combined compressive and torque forces acting on valve head 55 by connector sleeve 57 open valve flaps 62 to generally predetermined configuration, such that the rate of flow through discharge orifice 56 remains substantially constant, even though significant pressure differences are applied to bottle 100. As best illustrated in FIG. 8, after pressure differential valve 50 passes through the bifurcation state shown in FIG. 7, in the direction of opening, it quickly and positively assumes the fully open condition shown in FIG. 8, wherein the end edges 69 of valve flaps 67 diverge radially outwardly, such that discharge opening 56 assumes a star shaped plan configuration, as best seen in FIG. 8. The marginal edge 58 of valve head 55 rotates or pivots inwardly somewhat under the pressure of fluid product W, and the resilient torque applied thereto by connector sleeve 55, which continues to resiliently urge pressure differential valve 50 back toward its original molded shape (FIG. 4). Connector sleeve 57 remains tensed both axially and circumferentially under outwardly directed forces generated by the pressures within bottle 100, as well as the dynamic flow of fluid product through orifice 56. The geometry of the illustrated pressure differential valve 50, particularly in the shape of valve head 55 and connector sleeve 57, serve to force valve 50 into the configuration shown in FIG. 7 and 8 whenever orifice 56 is snapped opened.

Figure 6:
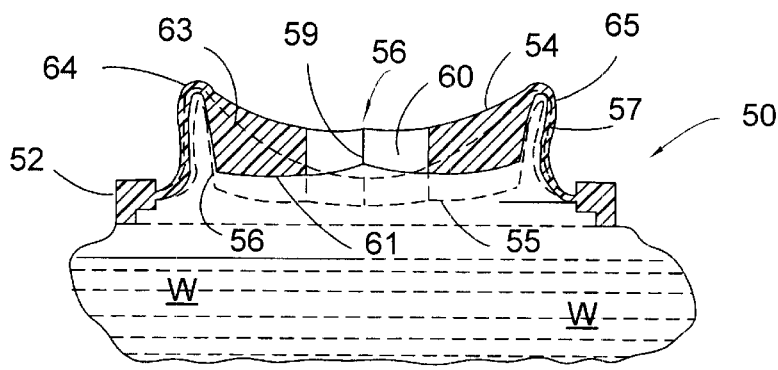
FIG. 6 is a cross-sectional view of the pressure differential valve used in the present invention shown in a fully closed, and fully extended position, wherein a valve head portion which is shown continuing to snap outwardly.

When pressure within the interior of bottle 100 is reduced, discharge orifice 56 will still remain open in substantially the fully open position shown in FIGS. 7 and 8, until the pressure reaches the preselected closure pressure, at which point, the forces developed in connector sleeve 57 through elastic deformation from its original molded shape (FIG. 4), pull valve head 55 inwardly, back through the bifurcation state, and into the concave orientation shown in FIG. 6, thereby positively and securely closing discharge orifice 56 with a snapping action, similar to that action by which discharge orifice 56 opened. The snap closing motion of valve head 55 serves to close orifice 56 very quickly and very completely, so as to sharply cut off the stream of fluid product being dispensed from bottle 100 without any drops or dribbles. Pressure differential valve 50 will continue to assume the fully closed fully extended position illustrated in FIG. 4, until such time as the interior pressure in container 56 is further reduced, so as to permit the resiliency in connector sleeve 57 to shift valve head 55 back into the fully retracted, initial position illustrated in FIG. 4.

Figure 9:
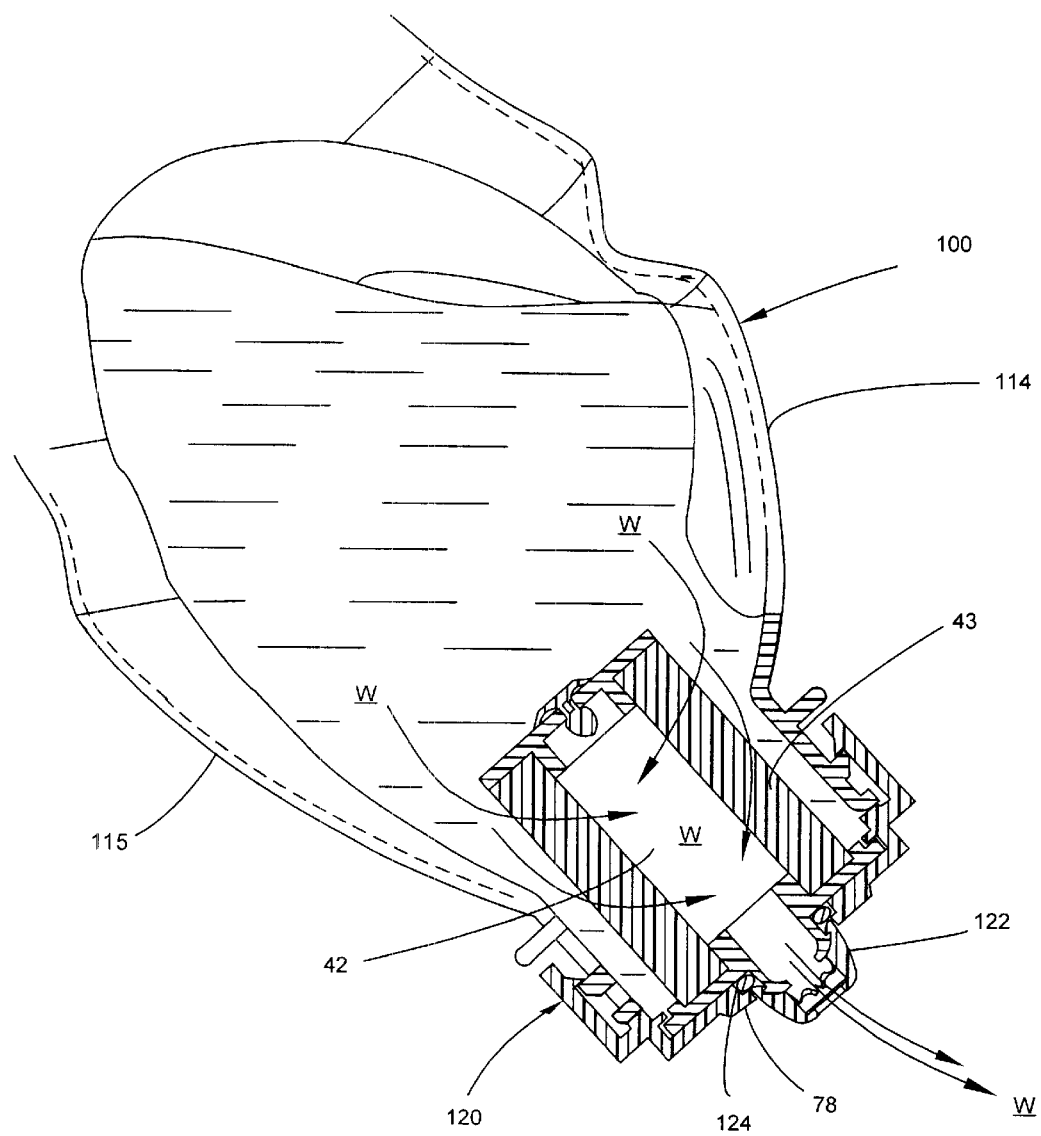
FIG. 9 is a side, cross-sectional view of the valved filter of FIG. 2, installed within a bottle, with arrows showing water flow from the squeezed bottle through the filter and pressure differential valve.
Figure 10:
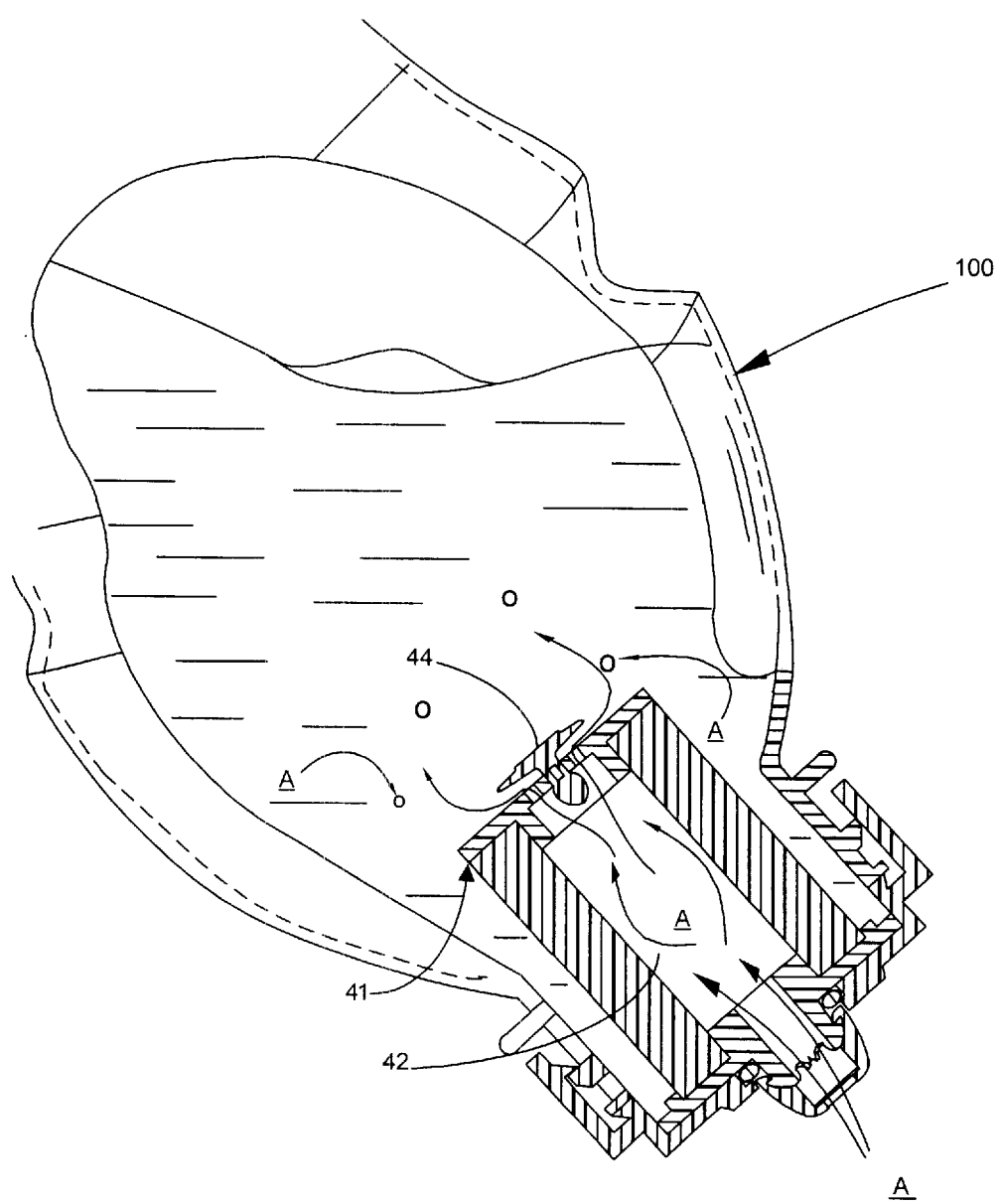
FIG. 10 is a side, cross-sectional view of the valved filter of FIG. 2, installed within a bottle, with arrows showing air flow through the pressure differential valve.
Figure 13:
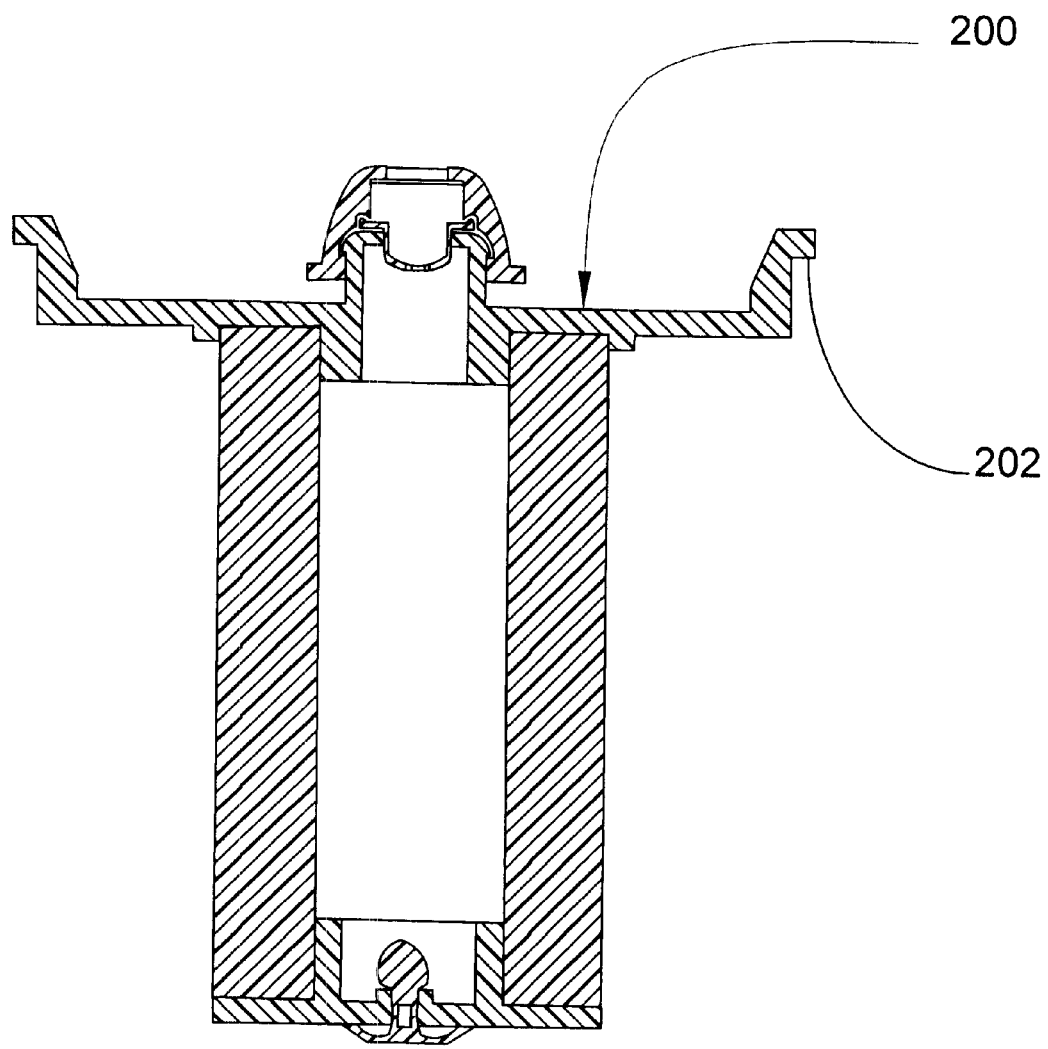
FIG. 13 is a side, cross-sectional view of an alternate embodiment of the valved filter of FIG. 2 having a flanged cap which cooperates with the lip of a bottle neck.

In use in a plastic bottle 100, the valved filter assembly 10 of the present invention is preferably attached to a bottle cap 120 having an open orifice 122 which receives valve cover 70 and is then inserted into the bottle neck as shown in FIGS. 9 and 10. The valved filter of the present invention may be secured to the bottle cap 120 by a number of methods, such as by a weld (e.g. an ultrasonic, thermal, or spin weld). Alternatively, the attachment mechanism may comprise an adhesive, or a mechanical connection, such as a bayonet mount (as is shown in FIGS. 9 and 10), a snap fit, or using O-rings that compress into a collar and hold the valved filter. In an alternate embodiment shown in FIG. 13 the filter cap 200 could be designed to have a flange 202 as is disclosed in U.S. Pat. No. 5,840,185, which is incorporated herein by reference, and thus the valved filter would be supported by the lip of the bottle neck and not attached to the bottle cap 120.

As the plastic bottle 100 is squeezed (FIG. 9), water W is purified as it is forced through the porous liquid side wall 43 of filter body 40 and channeled up through counter bores 42 and 26 until it comes into contact with pressure differential valve 50. As discussed previously the water pressure causes valve 50 to open and the water exits. As the user releases the bottle 100, it remembers its original shape and attempts to return to that shape (FIG. 10). In doing so, the bottle sucks in air A. The air A in this case passes through the counter bore 42 and down to the bottom cap 41 where it exits through a plurality of air port 46 covered by an umbrella valve 44, preferably made of ethylene propylene (for example, "EPDM").

The umbrella valve 40 is a one-way valve that collapses flat against the bottom surface of the filter base 41 when the bottle is squeezed, but opens easily as air pushes against it from the opposite direction. Essentially, it opens the same way an umbrella would inappropriately collapse if pointed away from the wind.

Figure 11:
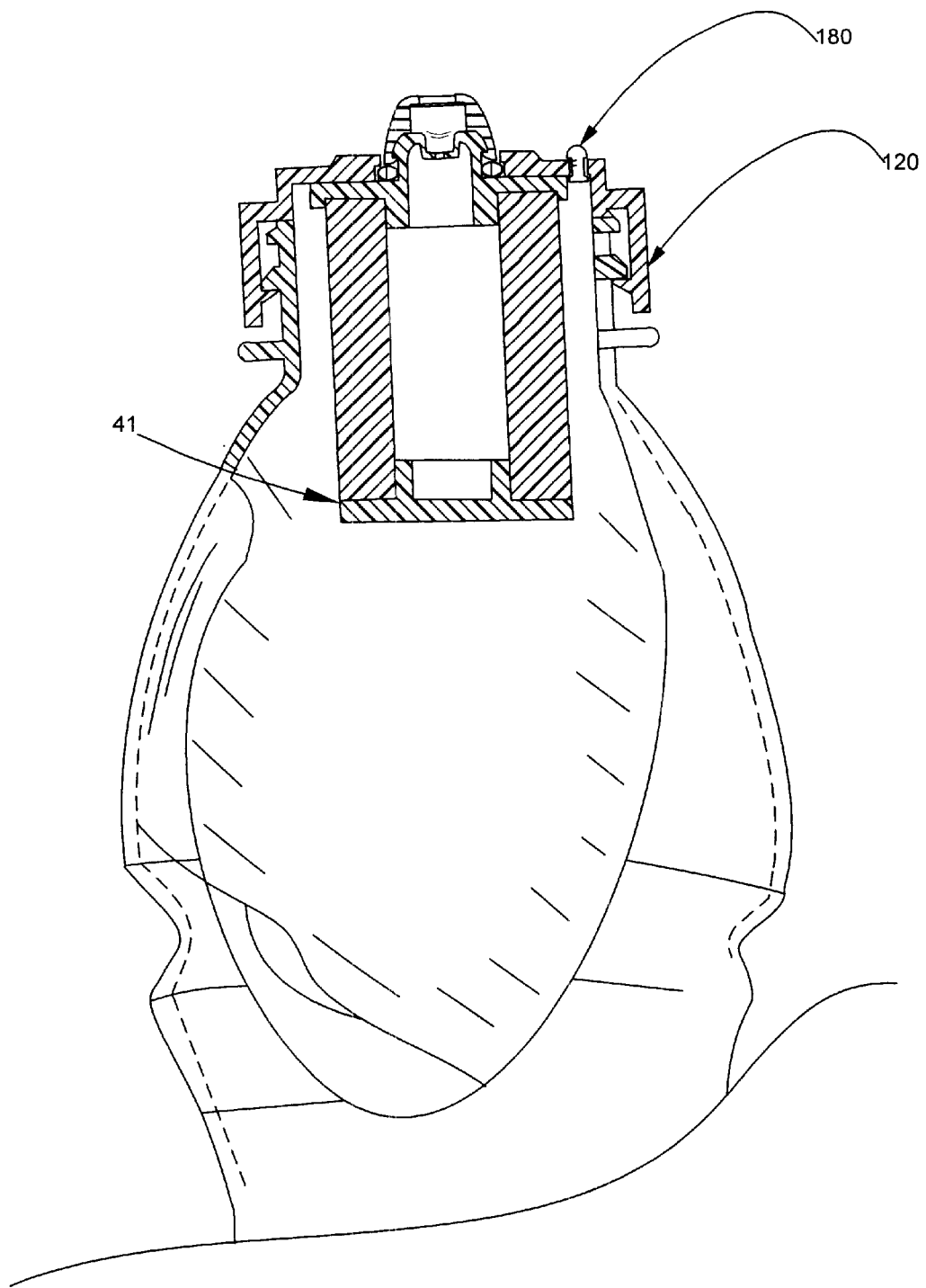
FIG. 11 is a side, cross-sectional view of an alternate embodiment of the valved filter of FIG. 2, installed within a bottle, with arrows showing air flow through an air inlet positioned in the bottle cap.

In an alternate embodiment as shown in FIG. 11 the filter base 41 does not have a one way valve. Instead an air return port 180 in positioned in the bottle cap 120. Air return valve 180 may be any one way valve such as an umbrella valve as discussed above or it may be a duck bill valve.

Figure 12:
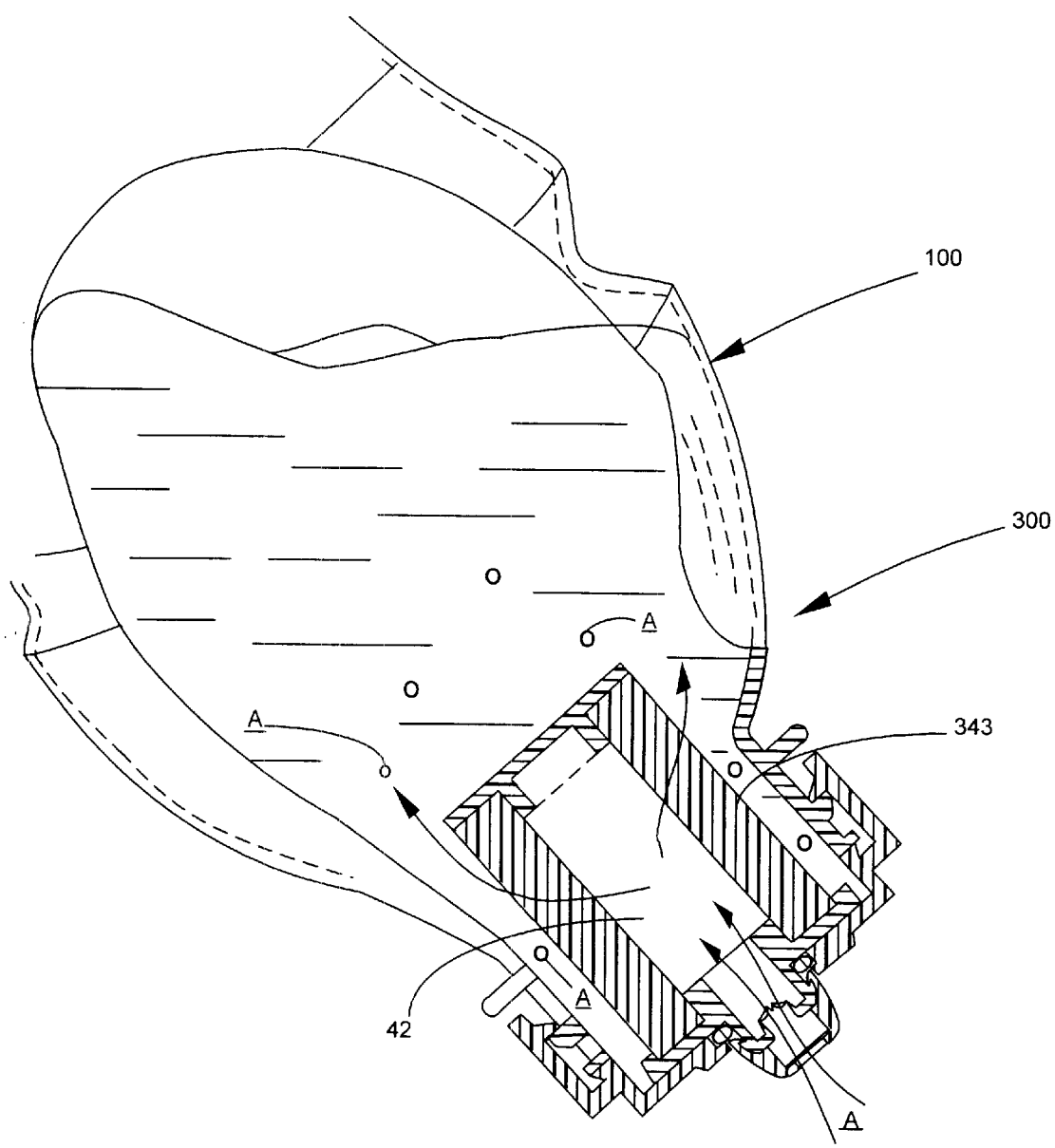
FIG. 12 is a side, cross-sectional view of an alternate embodiment of the valved filter of FIG. 2, installed within a bottle, with arrows showing air flow through the filter cartridge.

In a second alternate embodiment, shown in FIG. 12, the valved filter assembly 300 comprises a filter having a median pore diameter in the range of 7 to 80 microns as determined by a porsimeter analysis which allows the air A to vent back through the filter side walls 343 instead of through an air return valve.

The foregoing description is considered as illustrative only of the principles of the invention. The words "comprise," "comprising," "include," "including," and "includes" when used in this specification and in the following claims are intended to specify the presence of one or more stated features, integers, components, or steps, but they do not preclude the presence or addition of one or more other features, integers, components, steps, or groups thereof. Furthermore, since a number of modifications and changes will readily will readily occur to those skilled in the art, it is not desired to limit the invention to the exact construction and process shown described above. Accordingly, all suitable modifications and equivalents may be resorted to falling within the scope of the invention as defined by the claims which follow.

The embodiments of the invention in which an exclusive property or privilege is claimed are defined as follows:

1. A valved liquid filtering device for use within a squeeze bottle containing liquid comprising:
   a filter cartridge having a side wall, a top end and a bottom end wherein said bottom end is closed thereby directing the filtered liquid out through said top end;
   an automatic valve in fluid communication with said top end of said filter cartridge wherein the filtered liquid exits the squeeze bottle through said automatic valve.

2. The valved liquid filtering device of claim 1, wherein said filter cartridge comprises a substantially continuous self-supporting body of a liquid porous filtering media.

3. The valved liquid filtering device of claim 2, wherein said body of said filtering media has a hollow interior formed by the side walls of said liquid-porous filtering media.

4. The valved liquid filtering device of claim 3, wherein said bottom end of said filter cartridge is formed by said liquid-porous filtering media.

5. The valved liquid filtering device of claim 4, wherein said filter cartridge abuts a cap having a one-way valve.

6. The valved liquid filtering device of claim 3, wherein said bottom end of said filter cartridge is closed off by attaching an end cap over the end of said bottom end.

7. The valved liquid filtering device of claim 6, wherein said end cap comprises a one way air valve that opens when air returns to the bottle.

8. The valved liquid filtering device of claim 6, wherein said filter cartridge abuts a cap having a one-way valve.

9. The valved liquid filtering device of claim 2, wherein said liquid porous filtering media is an activated carbon.

10. The valved liquid filtering device of claim 2, wherein said liquid porous filtering media is a liquid plastic.

11. The valved liquid filtering device of claim 1, wherein said filter cartridge comprises a housing for enclosing a loose filtering media wherein said housing has a plurality of water inlets for receiving and directing water through said filter media and out said top end.

12. The valved liquid filtering device of claim 1, wherein said top end of said filter cartridge is sealed with a top cap and wherein said automatic valve is bi-directional and located within said top cap.

13. The valved liquid filtering device of claim 1, wherein said automatic valve is a pressure differential bi-directional valve that opens when water under pressure comes in contact with said automatic valve.

14. The valved liquid filtering device of claim 12, wherein said top cap is reversibly or irreversibly received by a bottle cap.

15. The valved liquid filtering device of claim 14, wherein said top cap is connected to said bottle cap by adhesive mechanically or by welding.

16. The valved liquid filtering device of claim 1, wherein said top end of said filter cartridge is sealed with a top cap wherein said top cap further comprises a valve which is an automatic one-way valve.

17. The valved liquid filtering device of claim 16, wherein said filter cartridge reversibly or irreversibly engages said bottle cap wherein said bottle cap has an air inlet valve.

18. The valved liquid filtering device of claim 17, wherein said filter cartridge is connected to said bottle cap by adhesive, mechanically or by welding.

19. The valved liquid filtering device of claim 1, wherein said top end of said filter cartridge is sealed with a top cap comprising a flange which when said filter cartridge is inserted into the neck of the squeeze bottle said flange rests on the lip of bottle neck and is secured in place by attaching the bottle cap to the bottle neck.

20. A valved liquid filtering device for use within a squeeze bottle containing liquid comprising:
a tube of filtering material, having a substantially continuous liquid-porous side wall a hollow interior, a top end and a bottom end;
a filter cap for sealing the top end of said filtering material wherein said cap comprises an automatic valve for controlling the flow of liquid from within the squeeze bottle and a valve cover;
a bottle cap having a filter for cooperating and sealing the bottle neck and further having an open orifice through the top surface and bottom surface of said bottle cap which reversibly or irreversibly receives said valve cover of said filter cap.

21. The valved liquid filtering device of claim 20, wherein said automatic valve is bi-directional.

22. The valved liquid filtering device of claim 20, wherein said bottom end is closed off.

23. The valved liquid filtering device of claim 22, wherein said bottom end comprises a one-way valve which opens when air returns to said bottle.

24. The valved liquid filtering device of claim 20, wherein said bottle cap comprises an air inlet.

25. The valved liquid filtering device of claim 20, wherein the median pore diameter of said filtering material is in the range of 7 to 80 microns so that air can return to the bottle through the filtering material.

26. The valved liquid filtering device of claim 20, wherein said filtering material is molded from a carbon block.

27. The valved liquid filtering device of claim 20, wherein said filtering material is a porous plastic.

28. The valved liquid filtering device of claim 20, wherein said filter cap is adhesively connected to the bottom surface of said bottle cap.

29. The valved liquid filtering device of claim 20, wherein said filter cap is welded to the bottom surface of said bottle cap.

30. The valved liquid filtering device of claim 20, wherein said filter cap is mechanically connected to the bottom surface of said bottle cap.

31. The valved liquid filtering device of claim 30, where said mechanical connection is a bayonet mount.

32. A method of obtaining filtered liquid from a squeeze bottle without manually opening the squeeze bottle comprising:
securing a filter cartridge in the neck of the squeeze bottle wherein said filter cartridge comprises a pressure differential valve;
applying pressure to the bottle thereby forcing the contained liquid through the filter;
contacting said filtered water with said pressure differential valve thereby forcing said valve to open and allowing said filtered liquid to exit said bottle; and
releasing pressure from said bottle thereby drawing air back into said bottle and allowing said pressure differential valve to close.

* * * * *